United States Patent
Sin et al.

(10) Patent No.: US 8,209,100 B2
(45) Date of Patent: Jun. 26, 2012

(54) METHODS AND SYSTEMS FOR CONTROLLING BRAKING IN VEHICLES

(75) Inventors: Chong H. Sin, Lake Orion, MI (US);
Adam Busack, Westland, MI (US);
Patrick J. Monsere, Highland, MI (US);
Michael C. Roberts, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 480 days.

(21) Appl. No.: 12/436,566

(22) Filed: May 6, 2009

(65) Prior Publication Data

US 2010/0286882 A1 Nov. 11, 2010

(51) Int. Cl.
*B60T 13/74* (2006.01)
(52) U.S. Cl. ............... 701/70; 701/79; 303/20; 303/155
(58) Field of Classification Search ............... 701/70, 701/78, 79; 303/20, 121, 155; 318/269; 477/4
See application file for complete search history.

(56) References Cited

U.S. PATENT DOCUMENTS

| | | | |
|---|---|---|---|
| 7,204,564 B2* | 4/2007 | Brown et al. | 303/7 |
| 2008/0243323 A1* | 10/2008 | Karnjate et al. | 701/22 |
| 2009/0082935 A1* | 3/2009 | Leschuk et al. | 701/70 |
| 2009/0099745 A1* | 4/2009 | Karnjate et al. | 701/70 |
| 2010/0256885 A1* | 10/2010 | Logan et al. | 701/70 |
| 2010/0280724 A1* | 11/2010 | Monsere et al. | 701/70 |

* cited by examiner

*Primary Examiner* — Paul N Dickson
*Assistant Examiner* — Keith Frisby
(74) *Attorney, Agent, or Firm* — Ingrassia Fisher & Lorenz P.C.

(57) ABSTRACT

A method for controlling braking in a vehicle having a brake pedal includes the steps of calculating an intended amount of brake torque corresponding to a braking request made via application of the brake pedal, applying the intended amount of brake torque if a pre-determined condition pertaining to the vehicle is satisfied, and applying a filtered amount of brake torque if the pre-determined condition is not satisfied.

16 Claims, 3 Drawing Sheets

| VEHICLE SPEED | 0 | 1 | 2 | 3 | 4 | 5 | 6 | 7 | 8 | 9 | 10 |
|---|---|---|---|---|---|---|---|---|---|---|---|
| FILTERING COEFFICIENT | 0.03 | 0.04 | 0.05 | 0.08 | 0.11 | 0.15 | 1 | 1 | 1 | 1 | 1 |

| VEHICLE SPEED | 0 | 1 | 2 | 3 | 4 | 5 | 6 | 7 | 8 | 9 | 10 |
|---|---|---|---|---|---|---|---|---|---|---|---|
| FILTERING COEFFICIENT | 0.009 | 0.027 | 0.036 | 0.63 | 0.099 | 0.099 | 0.099 | 0.099 | 0.099 | 0.099 | 0.099 |

METHODS AND SYSTEMS FOR CONTROLLING BRAKING IN VEHICLES

TECHNICAL FIELD

The present invention generally relates to the field of vehicles and, more specifically, to methods and systems for controlling braking in vehicles.

BACKGROUND OF THE INVENTION

To enhance an operator's driving experience and a vehicle's performance and safety, various types of electronic enhancements and systems assist or replicate automotive systems that were previously mechanical in nature. One such automotive system is the brake-by-wire system. In a brake-by-wire system, an operator's activation of the brake pedal is determined by one or more sensors. Data from the sensors is then used by a computer or processor to determine an appropriate braking force to apply to the brakes.

Several different types of brake-by-wire systems exist. For example, in an electro-hydraulic braking control system, the computer commands an electro-hydraulic actuator to apply hydraulic pressure to the brake calipers to stop the vehicle. In contrast, in an electro-mechanical braking control system, the braking force is applied instead by an electronic caliper which utilizes a small motor to push the brake pads against the rotor to stop the vehicle. Additionally, vehicles can incorporate combined systems such as electro-mechanical and electro-hydraulic systems. Also, hybrid cars can utilize a combination of friction braking, which can be electro-mechanical or electro-hydraulic, and regenerative braking, which is also a type of electronic braking in which speed is reduced by converting kinetic energy into electrical energy.

Regardless of the particular type of braking control system, braking control systems generally utilize a measure of a driver's intended brake torque based on a measure of force applied to the brake pedal or a measure of travel of the brake pedal in determining driver intent. However, applying the driver's intended brake torque may provide for an uneven or bumpy braking event and/or a less than ideal braking experience for the driver and other occupants of the vehicle.

Accordingly, it is desirable to provide an improved method for controlling braking for a vehicle, for example that provides a smoother braking event and/or an enhanced braking experience for the driver and other occupants of the vehicle. It is also desirable to provide an improved program product for such controlling of braking for a vehicle. It is further desirable to provide an improved system for such controlling of braking for a vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling braking in a vehicle having a brake pedal is provided. The method comprises the steps of calculating an intended amount of brake torque corresponding to a braking request made via application of the brake pedal, applying the intended amount of brake torque if a pre-determined condition pertaining to the vehicle is satisfied, and applying a filtered amount of brake torque if the pre-determined condition is not satisfied.

In accordance with another exemplary embodiment of the present invention, a program product for controlling braking in a vehicle having a brake pedal is provided. The program product comprises a program and a computer-readable signal-bearing media. The program is configured to at least facilitate calculating an intended amount of brake torque corresponding to a braking request made via application of the brake pedal, applying the intended amount of brake torque if a pre-determined condition pertaining to the vehicle is satisfied, and applying a filtered amount of brake torque if the pre-determined condition is not satisfied. The computer-readable signal-bearing media bears the program.

In accordance with a further exemplary embodiment of the present invention, a system for controlling braking in a vehicle having a brake pedal is provided. The system comprises a brake pedal sensor and a brake controller. The brake pedal sensor is configured to at least facilitate obtaining a value relating to a braking request made via application of the brake pedal. The brake controller is coupled to the brake pedal sensor, and is configured to at least facilitate calculating an intended amount of brake torque corresponding to the braking request, applying the intended amount of brake torque if a pre-determined condition pertaining to the vehicle is satisfied, and applying a filtered amount of brake torque if the pre-determined condition is not satisfied.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
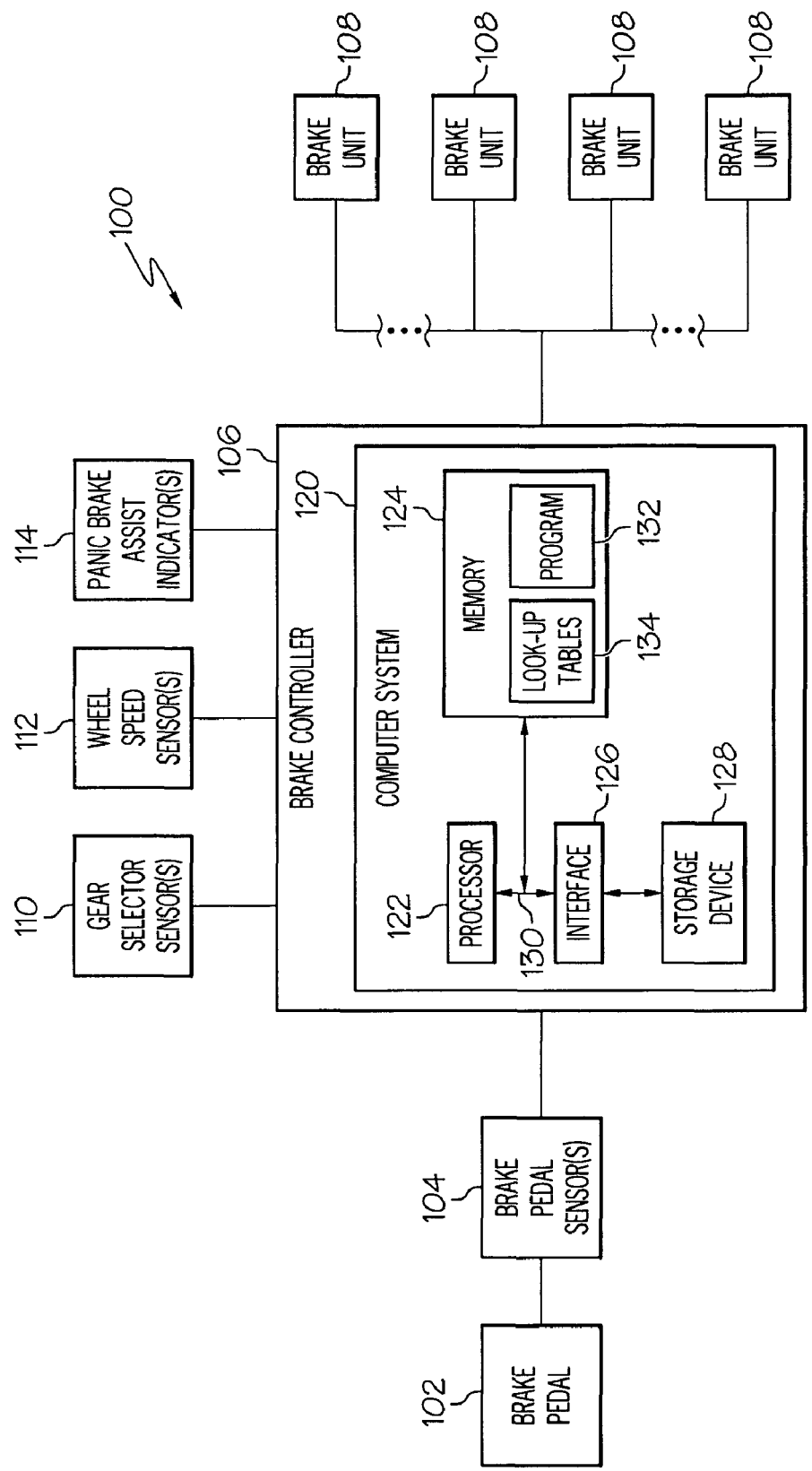
FIG. 1 is a functional block diagram of a braking control system for use in controlling braking in a vehicle, in accordance with an exemplary embodiment of the present invention.

FIG. 1 is a block diagram of an exemplary braking control system 100 for use in a brake-by-wire system, in accordance with an exemplary embodiment of the present invention. The braking control system 100 includes a brake pedal 102, one or more brake pedal sensors 104, a brake controller 106, and a plurality of brake units 108. In certain preferred embodiments, the braking control system 100 also includes one or more gear selection sensors 110, one or more wheel speed sensors 112, and one or more panic brake assist indicators 114. In certain other preferred embodiments, the braking control system 100 is instead coupled to the one or more gear selection sensors 110, the one or more wheel speed sensors 112, and/or the one or more panic brake assist indicators 114.

The brake pedal 102 provides an interface between an operator of a vehicle and a braking control system or a portion thereof, such as the braking control system 100, which is used to slow or stop the vehicle. To initiate the braking control system 100, an operator would typically use his or her foot to apply a force to the brake pedal 102 to move the brake pedal 102 in a generally downward direction. In one preferred embodiment the braking control system 100 is an electro-hydraulic system.

The one or more brake pedal sensors 104 are coupled to the brake pedal 102. The one or more brake pedal sensors 104 provide an indication of a driver's braking intent based upon the driver's application of the brake pedal 102.

In one preferred embodiment, the one or more brake pedal sensors 104 comprise a brake pedal travel sensor that measures how far the brake pedal 102 has traveled, which is also known as brake pedal travel, when the operator applies force to the brake pedal 102. In one exemplary embodiment, brake pedal travel can be determined by how far an input rod in a brake master cylinder has moved. Other methods of measuring brake travel can also be utilized.

In another preferred embodiment, the one or more brake pedal sensors 104 comprise a brake pedal force sensor that measures how much force the operator of braking control system 100 is applying to the brake pedal 102. This is also known as brake pedal force. In one exemplary embodiment, such a brake pedal force sensor may include a hydraulic pressure emulator and/or a pressure transducer, and the brake pedal force can be determined by measuring hydraulic pressure in a master cylinder of the braking control system 100.

In various embodiments, multiple brake pedal sensors 104 may be utilized. For example, in certain embodiments, the one or more brake pedal sensors 104 may comprise one or more brake pedal travel sensors and one or more brake pedal force sensors, among other possible variations to the one or more brake pedal sensors 104.

The brake controller 106 is coupled to the one or more brake pedal sensors 104, as well as to the one or more gear selector sensors 110, the one or more wheel speed sensors 112, the one or more panic brake assist indicators 114, and to the brake units 108. The one or more gear selector sensors 110 detect information as to whether or not a gear selector of the vehicle is functioning properly, and provide this information to the brake controller 106 for processing and for use in controlling braking for the vehicle. The one or more wheel speed sensors 112 detect information as to a speed of the vehicle and/or as to whether the wheel speed sensors 112 are functioning properly, and provide this information to the brake controller 106 for processing and for use in controlling braking for the vehicle. The one or more panic brake assist indicators 114 detect information as to whether a panic brake assist system is active for the vehicle and provide this information to the brake controller 106 for processing and for use in controlling braking for the vehicle.

The brake controller 106 receives inputs from the one or more brake pedal sensors 104 and information from the one or more gear selector sensors 110, the one or more wheel speed sensors 112, and the one or more panic brake assist indicators 114. As described in more detail below, the brake controller 106 uses values from these inputs and information in determining a driver's intended amount of braking torque, in filtering the driver intended amount of braking torque as appropriate, and in applying the driver's intended amount of brake torque and/or a filtered braking torque as appropriate via the brake units 108, in accordance with the process 200 of FIG. 2 as set forth in greater detail further below.

In the depicted embodiment, the brake controller 106 includes a computer system 120 that includes a processor 122, a memory 124, an interface 126, a storage device 128, and a bus 130. The processor 122 performs the computation and control functions of the brake controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 122 executes one or more programs 132 contained within the memory 124 and, as such, controls the general operation of the computer system 120.

The memory 124 can be any type of suitable memory. This would include the various types of dynamic random access memory (DRAM) such as SDRAM, the various types of static RAM (SRAM), and the various types of non-volatile memory (PROM, EPROM, and flash). Also as depicted in FIG. 1, the memory 124 preferably stores the program 132 as well as look-up tables 134 used for filtering values of the driver's intended amount of brake torque and controlling braking for the vehicle as set forth in greater detail further below in connection with the process 200 of FIG. 2. The bus 130 serves to transmit programs, data, status and other information or signals between the various components of the computer system 120.

The interface 126 allows communication to the computer system 120, for example from a system driver and/or another computer system, and can be implemented using any suitable method and apparatus. It can include one or more network interfaces to communicate with other systems or components. The interface 126 may also include one or more network interfaces to communicate with technicians, and/or one or more storage interfaces to connect to storage apparatuses, such as the storage device 128.

The storage device 128 can be any suitable type of storage apparatus, including direct access storage devices such as hard disk drives, flash systems, floppy disk drives and optical disk drives. In one exemplary embodiment, the storage device 128 comprises a program product from which memory 124 can receive a program 132 that executes one or more embodiments of one or more processes of the present invention, such as the process 200 of FIG. 2 or portions thereof. In another exemplary embodiment, the program product may be directly stored in and/or otherwise accessed by the memory 124 and/or a disk such as that referenced below.

The bus 130 can be any suitable physical or logical means of connecting computer systems and components. This includes, but is not limited to, direct hard-wired connections, fiber optics, infrared and wireless bus technologies. During operation, the program 132 is stored in the memory 124 and executed by the processor 122. It will be appreciated that the brake controller 106 may differ from the embodiment depicted in FIG. 1, for example in that the brake controller 106 may be coupled to or may otherwise utilize one or more remote computer systems and/or other control systems.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 120 may also otherwise differ from the embodiment depicted in FIG. 1, for example in that the computer system 120 may be coupled to or may otherwise utilize one or more remote computer systems and/or other control systems.

The brake units 108 receive the brake commands from the brake controller 106, and are controlled thereby accordingly. The brake units 108 can include any number of different types of devices that, upon receipt of brake commands, can apply the proper braking torque as received from the brake controller 106. For example, in an electro-hydraulic system, the brake units 108 can comprise an actuator that can generate hydraulic pressure that can cause brake calipers to be applied to a brake disk to induce friction to stop a vehicle. Alternatively, in an electro-mechanical brake-by-wire system, the brake units 108 can comprise a wheel torque-generating device that operates as a vehicle brake. The brake units 108 can also be regenerative braking devices, in which case the brake units 108, when applied, facilitate conversion of kinetic energy into electrical energy.

Figure 2:
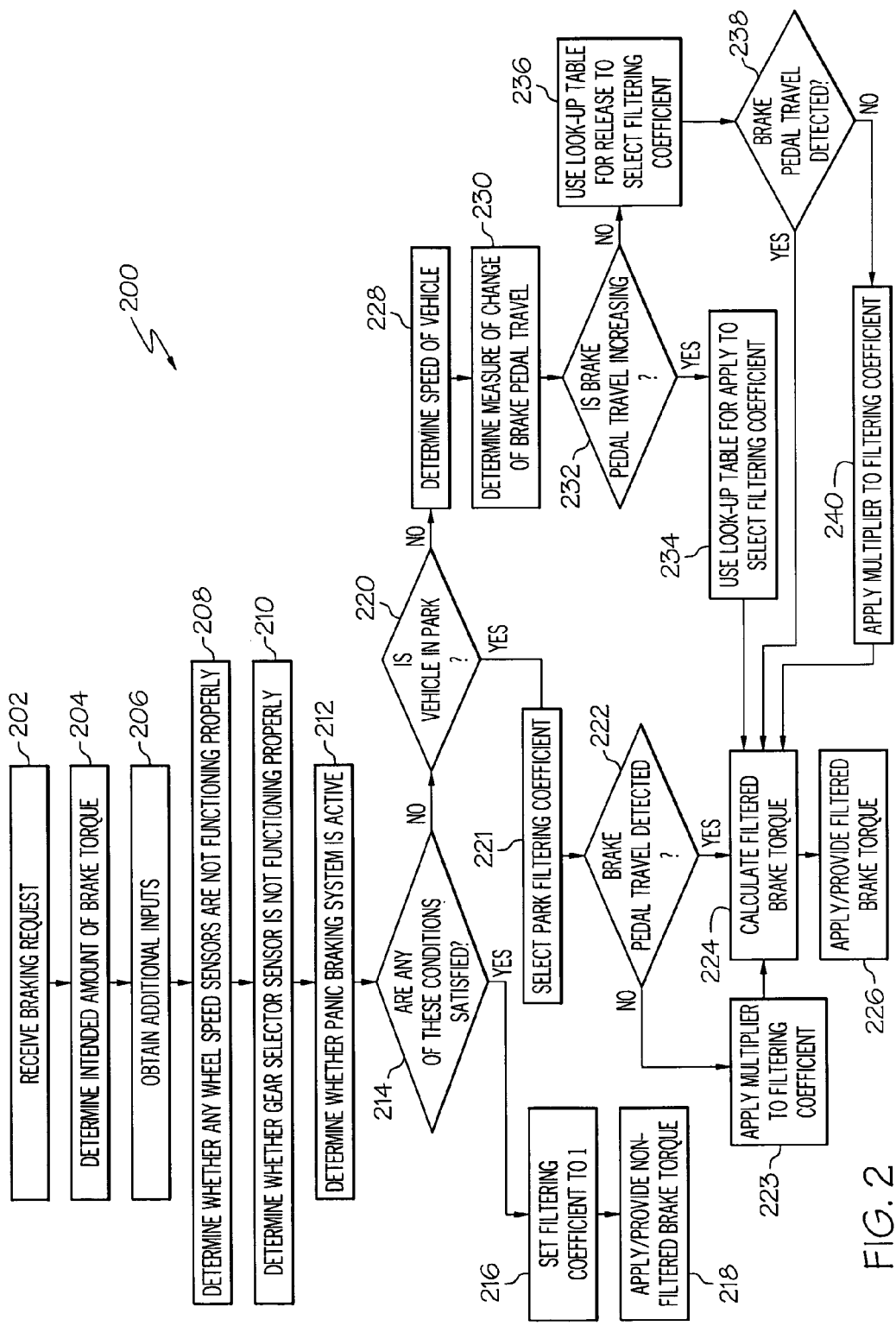
FIG. 2 is a flowchart of a process for controlling braking in a vehicle, and that can be implemented in connection with the braking control system of FIG. 1, in accordance with an exemplary embodiment of the present invention.
Figure 3A:
FIG. 3 is a functional block diagram of exemplary look-up tables that can be used in connection with the process of FIG. 2 and the braking control system of FIG. 1, in accordance with an exemplary embodiment of the present invention.
Figure 3B:

FIG. 2 is a flowchart of a process 200 for controlling braking in a vehicle, in accordance with an exemplary embodiment of the present invention. The process 200 can be implemented in connection with the braking control system 100 of FIG. 1 and/or the computer system 120 of FIG. 1 and/or program products utilized therewith, in accordance with an exemplary embodiment of the present invention. The process 200 will also be described below in connection with FIG. 3, which depicts exemplary look-up tables for filtering values of the driver's intended amount of braking torque using a velocity of the vehicle and a measure of brake pedal travel in accordance with one exemplary embodiment of the present invention.

As depicted in FIG. 2, the process 200 begins with the step of receiving a braking request from the driver of the vehicle (step 202). In a preferred embodiment, the one or more brake pedal sensors 104 obtain values related to the braking request, generate signals representative thereof, and transmit the signals to the brake controller 106 of FIG. 1 for processing by the brake controller 106 and for use in controlling braking for the vehicle. Also in one preferred embodiment, the values comprise measures of brake pedal travel during operation of the vehicle. In another preferred embodiment, the values comprise measures of force applied to the brake pedal during operation of the vehicle.

A driver's intended brake torque is then determined (step 204). In a preferred embodiment, the driver's intended brake torque represents an intended amount of brake torque that the driver wishes to have applied to the brake units 108 of FIG. 1, based on the driver's application of the brake pedal 102 of FIG. 1. In certain preferred embodiments, the driver's intended brake torque is determined by the processor 122 of FIG. 1 using brake pedal travel information and/or brake pedal force information obtained from the one or more brake pedal sensors 104 of FIG. 1 during step 202.

Additional inputs are also obtained (step 206). In a preferred embodiment, the additional inputs pertain to whether a gear selector sensor of the vehicle is functioning properly, whether a wheel speed sensor of the vehicle is functioning properly, and whether a panic brake assist system of the vehicle is active. Also in a preferred embodiment, these inputs are preferably obtained by the processor 122 of the brake controller 106 from the one or more gear selector sensors 110, the one or more wheel speed sensors 112, and the one or more panic brake assist indicators 114 of FIG. 1, respectively.

In addition, in one preferred embodiment, one or more wheel speed values are also obtained, preferably as part of the additional inputs obtained in step 206. The one or more wheel speed values are preferably obtained by the processor 122 of the brake controller 106 of FIG. 1 from the one or more wheel speed sensors 112 of FIG. 1. Moreover, also in one preferred embodiment, information is obtained as to whether the vehicle is in a park mode. This information is preferably obtained by the processor 122 of the brake controller 106 of FIG. 1 from the one or more gear selector sensors 110 of FIG. 1.

A determination is then made as to whether any wheel speed sensors are not functioning properly (step 208). In a preferred embodiment, this determination is made by the processor 122 of the brake controller 106 of FIG. 1 using the additional inputs obtained from the one or more wheel speed sensors 112 of FIG. 1 in step 206 described above.

A determination is also made as to whether any gear selectors of the vehicle are not functioning properly (step 210). In a preferred embodiment, this determination is made by the processor 122 of the brake controller 106 of FIG. 1 using the additional inputs obtained from the one or more gear selector sensors 110 of FIG. 1 in step 206 described above.

In addition, a determination is also made as to whether any panic brake assist systems of the vehicle are active (step 212). In a preferred embodiment, this determination is made by the processor 122 of the brake controller 106 of FIG. 1 using the additional inputs obtained from the one or more panic brake assist indicators 114 of FIG. 1 in step 206 described above.

A determination is then made as to whether any of the conditions of steps 208, 210, and 212 are satisfied (step 214). Specifically, in a preferred embodiment, a determination is made in step 214 as to whether one of the following conditions is satisfied; namely, that a wheel speed sensor is not functioning properly, a gear selector sensor is not functioning properly, and/or a panic braking system is active. In a preferred embodiment, this determination is made by the processor 122 of the brake controller 106 of FIG. 1.

If it is determined that one or more of these conditions of step 214 are satisfied, then the process proceeds to step 216. During step 216, a filtering coefficient for braking torque is set equal to one. In a preferred embodiment, this step is performed by the processor 122 of the brake controller 106 of FIG. 1. Non-filtered brake torque is then applied (step 218). Specifically, in a preferred embodiment, braking torque is applied via the brake units 108 of FIG. 1 per instructions provided by the processor 122 of FIG. 1 in an amount that is equal to the driver's intended brake torque determined in step 204. Alternatively stated, braking torque is applied with a multiplicative filtering coefficient equal to one (i.e., with no filtering of the amount of brake torque to be applied).

Conversely, if it is determined that none of the conditions of step 214 are satisfied, then the process proceeds instead to step 220. During step 220, a determination is made as to whether the vehicle is in a park mode. In a preferred embodiment, this determination is made by the processor 122 of the brake controller 106 of FIG. 1 using information provided thereto by the one or more gear selector sensors 110 of FIG. 1 as part of the additional inputs obtained during step 206 described above.

If it is determined in step 220 that the vehicle is in a park mode, then a park filtering coefficient is selected for the amount of brake torque to be applied (step 221). In one preferred embodiment, the park filtering coefficient is a first-order multiplicative filtering coefficient and is passed to a first order filter. However, this may vary in other embodiments. Also in one preferred embodiment, the park filtering coefficient is equal to approximately 0.01. However, this may also vary in other embodiments. For example, in certain embodiments, the park filtering coefficient may be equal to another constant or may be a function of one or more other variables, parameters, and/or conditions.

Regardless of the value of the park filtering coefficient, a determination is then made as to whether brake pedal travel is detected (step 222). In a preferred embodiment, this determination is made by the processor 122 of the brake controller 106 of FIG. 1 using inputs and/or data obtained from steps 202, 204, an/or 206 above, and/or from other inputs and/or data using commonly available methods known in the industry.

If brake pedal travel is not detected, then the algorithm determines that the driver is not applying the brake pedal, and a multiplier is applied to the filtering coefficient (step 223). In certain preferred embodiments, the multiplier is approximately between seven and ten. However, this may vary in other embodiments. The multiplier helps to quickly ramp out the torque request when the driver is not applying the brake pedal. In a preferred embodiment, the multiplier is applied by the processor 122 of the brake controller 106 of FIG. 1.

The filtered brake torque is then calculated using the appropriate filtering coefficient (step 224). Specifically, in accordance with a preferred embodiment, the filtering coefficient of steps 221 and 223 (i.e., with the multiplier applied) is multiplied by the driver's intended brake torque of step 204 in order to calculate the filtered brake torque in step 224. The filtered braking torque is preferably calculated by the processor 122 of the brake controller 106 of FIG. 1.

Conversely, if brake pedal travel is detected, then the algorithm determines that the driver is applying the brake pedal. In this situation, a multiplier is not applied to the filtering coefficient. Instead, the process proceeds directly to the above-referenced step 224, in which the filtering coefficient of step 221 (i.e., without any multiplier of step 223) is utilized in calculating the filtered brake torque. Specifically, in accordance with a preferred embodiment, the filtering coefficient of step 221 is multiplied by the driver's intended brake torque of step 204 in order to calculate the filtered brake torque in step 224. The filtered braking torque is preferably calculated by the processor 122 of the brake controller 106 of FIG. 1.

Regardless of the particular calculation in step 224, the filtered brake torque is then applied (step 226). Specifically, in a preferred embodiment, braking torque is applied via the brake units 108 of FIG. 1 per instructions provided by the processor 122 of FIG. 1 in an amount that is equal to the filtered brake torque calculated in step 224 using the appropriate filtering coefficient as described above.

Conversely, if it is determined in step 220 that the vehicle is not in a park mode, then a speed of the vehicle is determined (step 228). In a preferred embodiment, this determination is made by the processor 122 of the brake controller 106 of FIG. 1 using information provided thereto by the one or more wheel speed sensors 112 of FIG. 1 as part of the additional inputs obtained during step 206 described above.

In addition, a measure of change of travel of the brake pedal is also determined (step 230). In a preferred embodiment, this determination is made by the processor 122 of the brake controller 106 of FIG. 1 using brake pedal travel information provided thereto by the one or more brake pedal sensors 104 of FIG. 1 during step 202 described above. Specifically, in one preferred embodiment, the measure of change of travel of the brake pedal comprises an amount of change of brake pedal travel between the current value of brake pedal travel and a previous value of brake pedal travel. Also in one preferred embodiment, the measure of change of travel of the brake pedal comprises whether a speed of travel of the brake pedal is positive (i.e., for increasing travel of the brake pedal) or negative (i.e., for decreasing travel of the brake pedal).

A determination is then made as to whether the travel of the brake pedal is increasing (step 232). In a preferred embodiment, this determination is also made by the processor 122 of FIG. 1. If it is determined in step 232 that the brake pedal travel is increasing (i.e., that the driver is currently applying the brake pedal), then the process proceeds to step 234. During step 234, a filtering coefficient is selected using a first look-up table. For example, in accordance with one exemplary embodiment, the first look-up table is depicted as table 300 in FIG. 3. In the depicted embodiment, the filtering coefficient generally increases (i.e., filtering generally decreases) with vehicle speed until the vehicle speed exceeds six miles per hour as shown in the exemplary table 300 of FIG. 3. However, this may vary in other embodiments. In a preferred embodiment, the filtering coefficient is a first-order multiplicative filtering coefficient and is passed to a first order filter. However, this may also vary in other embodiments. Also in a preferred embodiment, the first look-up table corresponds to one of the look-up tables 134 stored in the memory 124 of the computer system 120 of the brake controller 106 of FIG. 1.

The process then proceeds to the above-referenced step 224, in which the filtering coefficient from step 234 is utilized in calculating the filtered brake torque. Specifically, in accordance with a preferred embodiment, this filtering coefficient is multiplied by the driver's intended brake torque of step 204 in order to calculate the filtered brake torque in step 224. The filtered braking torque is preferably calculated by the processor 122 of the brake controller 106 of FIG. 1.

The process then proceeds to the above-referenced step 226, in which the filtered brake torque is applied (step 226). Specifically, in a preferred embodiment, braking torque is applied via the brake units 108 of FIG. 1 per instructions provided by the processor 122 of FIG. 1 in an amount that is equal to the filtered brake torque calculated in step 224 using the appropriate filtering coefficient as described above.

Conversely, if it is determined in step 232 that the brake pedal travel is not increasing (i.e., that the driver is currently releasing the brake pedal or holding the brake pedal steady), then the process proceeds instead to step 236. During step 236, a filtering coefficient is selected using a second look-up table. For example, in accordance with one exemplary embodiment, the second look-up table is depicted as table 302 in FIG. 3. In the depicted embodiment, the filtering coefficient generally increases (i.e., filtering generally decreases) with vehicle speed until the vehicle speed exceeds four miles per hour as shown in the exemplary table 300 of FIG. 3. Also in the depicted embodiment, the filtering coefficients in the table 302 of FIG. 3 (i.e., when the driver is releasing the brake pedal) are generally less (i.e., filtering is generally greater) than their respective filtering coefficients of table 300 of FIG. 3 (i.e., when the driver is applying the brake pedal) for common values of vehicle speed. However, this may vary in other embodiments. In a preferred embodiment, the filtering coefficient is a first-order multiplicative filtering coefficient and is passed to a first order filter. However, this may also vary in other embodiments. Also in a preferred embodiment, the second look-up table corresponds to one of the look-up tables 134 stored in the memory 124 of the computer system 120 of the brake controller 106 of FIG. 1.

A determination is then made as to whether brake pedal travel is detected (step 238). In a preferred embodiment, this determination is made by the processor 122 of the brake controller 106 of FIG. 1 using inputs and/or data obtained from steps 202, 204, an/or 206 above, and/or from other inputs and/or data using commonly available methods known in the industry.

If brake pedal travel is not detected, then the algorithm determines that the driver is not applying the brake pedal, and a multiplier is applied to the filtering coefficient (step 240). In certain preferred embodiments, the multiplier is approximately between seven and ten. However, this may vary in other embodiments. The multiplier helps to quickly ramp out the torque request when the driver is not applying the brake pedal. In a preferred embodiment, the multiplier is applied by the processor 122 of the brake controller 106 of FIG. 1. The process then proceeds to the above-referenced step 224, in which the filtering coefficient of steps 236 and 240 (i.e., with the multiplier applied) is utilized in calculating the filtered brake torque. Specifically, in accordance with a preferred embodiment, this filtering coefficient, with the multiplier already applied, is then multiplied by the driver's intended brake torque of step 204 in order to calculate the filtered brake torque in step 224. The filtered braking torque is preferably calculated by the processor 122 of the brake controller 106 of FIG. 1.

Conversely, if brake pedal travel is detected, then the algorithm determines that the driver is applying the brake pedal. In this situation, a multiplier is not applied to the filtering coefficient. Instead, the process proceeds directly to the above-referenced step 224, in which the filtering coefficient of step 236 (i.e., without any multiplier of step 240) is utilized in calculating the filtered brake torque. Specifically, in accordance with a preferred embodiment, the filtering coefficient of step 236 is multiplied by the driver's intended brake torque of step 204 in order to calculate the filtered brake torque in step 224. The filtered braking torque is preferably calculated by the processor 122 of the brake controller 106 of FIG. 1.

In either case, regardless of whether a multiplier is applied in step 240, following step 224 the process proceeds to the above-referenced step 226, in which the filtered brake torque is applied (step 226). Specifically, in a preferred embodiment, braking torque is applied via the brake units 108 of FIG. 1 per instructions provided by the processor 122 of FIG. 1 in an amount that is equal to the filtered brake torque calculated in step 224 using the appropriate filtering coefficient as described above.

Thus, the process 200 provides for filtering of the amount of brake torque to be applied except for situations in which one or more gear selector sensors and/or wheel speed sensors are not functioning properly and/or in which a panic brake assist system of the vehicle is active. In a preferred embodiment, a constant filtering coefficient is used if the vehicle is in a park mode. Also in a preferred embodiment, velocity-dependent look-up tables are utilized if the vehicle is not in a park mode.

Specifically, in accordance with a preferred embodiment, if the vehicle is not in a park mode, different look-up tables are utilized depending on whether brake pedal travel is increasing (i.e., if the brake pedal is being applied by the driver) or whether the brake pedal travel is decreasing (i.e., if the brake pedal is being released by the driver). As shown in the exemplary tables 302, 304 of FIG. 3, preferably the filtering coefficient generally increases up to a point with an increase in vehicle velocity. Also as shown in the exemplary tables 302, 304 of FIG. 3, preferably the filtering coefficient is greater during brake pedal application (i.e., the first table 302 of FIG. 3) than during brake pedal release (i.e., the second table 304 of FIG. 3) for a given vehicle velocity. These features help to smooth out the uneven and/or bumpy application of the brake pedal as the driver applies and releases the brake pedal.

Accordingly, improved methods, program products, and systems are provided. The improved methods, program products, and system provide for improved control of braking in vehicles. For example, the improved methods, program products, and system provide for a smoother braking event and/or an enhanced braking experience for the driver and other occupants of the vehicle.

It will be appreciated that the disclosed methods, program products, and systems may vary from those depicted in the Figures and described herein. For example, it will be appreciated that certain steps of the process 200 may vary from those depicted in FIG. 2 and/or described herein in connection therewith. It will similarly be appreciated that certain steps of the process 200 may occur simultaneously or in a different order than that depicted in FIG. 2 and/or described herein in connection therewith. It will similarly be appreciated that the disclosed methods, program products, and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling braking in a vehicle having a brake pedal, the method comprising the steps of:
   calculating an intended amount of brake torque corresponding to a braking request made via the brake pedal;
   applying the intended amount of brake torque if at least one of a plurality of pre-determined conditions pertaining to the vehicle is satisfied, wherein the plurality of pre-determined conditions are selected from the group consisting of: whether a wheel speed sensor is not functioning properly, whether a gear selector sensor is not functioning properly, and whether a panic brake assist program is active; and
   applying a filtered amount of brake torque if none of the pre-determined conditions are satisfied.

2. The method of claim 1, further comprising the steps of:
   measuring a speed of the vehicle; and
   calculating the filtered amount of brake torque based at least in part on the intended amount of braking torque and the speed of the vehicle.

3. The method of claim 2, wherein the step of calculating the filtered amount of brake torque further comprises the step of calculating the filtered amount of brake torque using a first order filter.

4. The method of claim 1, further comprising the steps of:
   determining whether the vehicle is in a park mode based on information obtained from a gear selector sensor;
   calculating the filtered amount of brake torque using a first filtering coefficient if it is determined that the vehicle is in the park mode; and
   calculating the filtered amount of brake torque using a second filtering coefficient if it is determined that the vehicle is not in the park mode.

5. The method of claim 4, further comprising the steps of:
   measuring a speed of the vehicle;
   determining whether a measure of travel of the brake pedal is increasing;

selecting the second filtering coefficient based at least in part on the speed of the vehicle and a first look-up table if the measure of travel of the brake pedal is increasing; and selecting the second filtering coefficient based at least in part on the speed of the vehicle and a second look-up table if the measure of travel of the brake pedal is decreasing.

6. A system for controlling braking in a vehicle having a brake pedal, the system comprising:
a brake pedal sensor configured to at least facilitate obtaining a value related to a braking request made via application of the brake pedal; and
a brake controller coupled to the brake pedal sensor and configured to at least facilitate:
calculating an intended amount of brake torque corresponding to the braking request;
applying the intended amount of brake torque if at least one of a plurality of pre-determined conditions pertaining to the vehicle is satisfied, wherein the plurality of pre- determined conditions are selected from the group consisting of: whether a wheel speed sensor is not functioning properly, whether a gear selector sensor is not functioning properly, and whether a panic brake assist program is active; and
applying a filtered amount of brake torque if none of the pre-determined conditions are satisfied.

7. The system of claim 6, wherein the brake controller is further configured to at least facilitate:
measuring a speed of the vehicle; and
calculating the filtered amount of brake torque based at least in part on the intended amount of braking torque and the speed of the vehicle.

8. The system of claim 7, wherein the brake controller is further configured to at least facilitate calculating the filtered amount of brake torque using a first order filter.

9. The system of claim 6, further comprising:
a gear selector sensor configured to at least facilitate providing information pertaining to a gear selector of the vehicle;
wherein the brake controller is coupled to the gear selector sensor and is further configured to at least facilitate:
determining whether the vehicle is in a park mode based on information obtained from a gear selector sensor;
calculating the filtered amount of brake torque using a first filtering coefficient if it is determined that the vehicle is in the park mode; and
calculating the filtered amount of brake torque using a second filtering coefficient if it is determined that the vehicle is not in the park mode.

10. The system of claim 9, wherein the brake controller is further configured to at least facilitate:
measuring a speed of the vehicle;
determining whether a measure of travel of the brake pedal is increasing;
selecting the second filtering coefficient based at least in part on the speed of the vehicle and a first look-up table if the measure of travel of the brake pedal is increasing; and
selecting the second filtering coefficient based at least in part on the speed of the vehicle and a second look-up table if the measure of travel of the brake pedal is decreasing.

11. A system for controlling braking in a vehicle having a brake pedal, the system comprising:
a gear selector sensor configured to at least facilitate providing information pertaining to a gear selector of the vehicle;
a brake pedal sensor configured to at least facilitate obtaining a value related to a braking request made via application of the brake pedal; and
a brake controller coupled to the brake pedal sensor and the gear selector and configured to at least facilitate:
determining whether the vehicle is in a park mode based on information obtained from the gear selector sensor;
calculating an intended amount of brake torque corresponding to the braking request;
calculating a filtered amount of brake torque using a first filtering coefficient if it is determined that the vehicle is in the park mode;
calculating the filtered amount of brake torque using a second filtering coefficient if it is determined that the vehicle is not in the park mode.
applying the intended amount of brake torque if a pre-determined condition pertaining to the vehicle is satisfied; and
applying the filtered amount of brake torque if the pre-determined condition is not satisfied.

12. The system of claim 11, wherein the brake controller is further configured to at least facilitate:
measuring a speed of the vehicle; and
calculating the filtered amount of brake torque based at least in part on the intended amount of braking torque and the speed of the vehicle.

13. The system of claim 12, wherein the brake controller is further configured to at least facilitate calculating the filtered amount of brake torque using a first order filter.

14. The system of claim 11, wherein the brake controller is further configured to at least facilitate:
applying the intended amount of brake torque if at least one of a plurality of pre-determined conditions pertaining to the vehicle is satisfied; and
applying the filtered amount of brake torque if none of the plurality of pre-determined conditions are satisfied.

15. The system of claim 14, wherein the plurality of pre-determined conditions are selected from the group consisting of: whether a wheel speed sensor is not functioning properly, whether a gear selector sensor is not functioning properly, and whether a panic brake assist program is active.

16. The system of claim 11, wherein the brake controller is further configured to at least facilitate:
measuring a speed of the vehicle;
determining whether a measure of travel of the brake pedal is increasing;
selecting the second filtering coefficient based at least in part on the speed of the vehicle and a first look-up table if the measure of travel of the brake pedal is increasing; and
selecting the second filtering coefficient based at least in part on the speed of the vehicle and a second look-up table if the measure of travel of the brake pedal is decreasing.

* * * * *